United States Patent
Wu

(10) Patent No.: US 6,377,025 B1
(45) Date of Patent: Apr. 23, 2002

(54) MOBILE PHONE BATTERY PACK WITH RECORDING DEVICE FOR MEMORIZING RECHARGED NUMBER OF TIMES

(75) Inventor: Clark Wu, Taipei (TW)

(73) Assignee: Tampa Communication Inc., Taipei (TW)

( * ) Notice: Subject to any disclaimer, the term of this patent is extended or adjusted under 35 U.S.C. 154(b) by 122 days.

(21) Appl. No.: 09/592,429

(22) Filed: Jun. 12, 2000

(51) Int. Cl.⁷ .............................................. H01M 10/46
(52) U.S. Cl. ...................................................... 320/132
(58) Field of Search ................................ 320/106, 107, 320/110, 132, 149, DIG. 21

(56) References Cited

U.S. PATENT DOCUMENTS 5,596,567 A * 1/1997 DeMuro et al.
5,780,992 A * 7/1998 Beard
6,031,353 A * 2/2000 Banyas et al.

* cited by examiner

*Primary Examiner*—Edward H. Tso
(74) *Attorney, Agent, or Firm*—Troxell Law Office PLLC

(57) ABSTRACT

A mobile phone battery pack with a recording device for memorizing total recharged number of times is disclosed. The recording device includes a battery charging detecting circuit, a reference clock generating circuit, a central processing unit, a recharged times recording unit. When placing the mobile phone battery in the battery charger for recharging, the total recharged number of times recorded in the recharged times recording unit will be increased by one. Preferably, the mobile phone battery pack incorporates with a display type battery charger with a display. The battery pack is provided with a data output terminal and a series data output device. So, the total recharged number of times memorized in the battery are transmitted to the battery charger through the data output terminal and the recharged number of times is displayed on the display of the battery charger.

6 Claims, 5 Drawing Sheets

MOBILE PHONE BATTERY PACK WITH RECORDING DEVICE FOR MEMORIZING RECHARGED NUMBER OF TIMES

BACKGROUND OF THE INVENTION

1. Field of the Invention

The present invention generally relates to a mobile phone battery pack, and in particular to a battery pack with a recording device for accumulating the recharged number of times.

2. Description of the Prior Art

The conventional battery charger for the mobile phone mainly includes a casing, a charging receptacle, and a number of indicating lamps showing the charging conditions. When placing a mobile phone battery to be recharged on the charging receptacle, the battery will be recharged under control of a control circuit.

However, the conventional battery charger for the mobile phone shows the charging condition just by a number of indicative lamps switching on/off or flashing, so that the user can not exactly realize the detail charging conditions during charging.

Besides, the battery has a standard usable age or total recharged times, for example discharging and recharging for 500 times. The user can not find out if the battery is over the usable age or should be replaced by a new one when charging the mobile phone by the conventional charger.

For the battery manufacturer, sometimes the battery is in good condition when production, but the performance may be not so good as expected because of the delivering process, the temperature or humidity of the storing environment, storing period, or incorrect using by the user after leaving the factory. When the manufacturer handle those complains from the consumers, it still can not be checked out that the problem comes from the bad quality of the battery itself, over-using of the usable age, or the incorrect using by the user. Even the information of the battery such as the date of production, batch number, or series number, also can not be found out.

It is thus desirable to provide a mobile phone battery pack with a recording device for memorizing the recharged number of times. Preferably, the battery pack incorporates with a display type battery charger with a LCD display for displaying the charging statuses and various internal information of the battery.

SUMMARY OF THE INVENTION

Accordingly, the primary object of the present invention is to provide a mobile phone battery pack equipped with a recording device capable of recording various information of the battery pack.

The other object of the present invention is to provide a mobile phone battery pack with a data recording device for memorizing the recharged number of times of the battery. Every time when the battery finished recharging, the records of accumulated recharged number will be increased by one. The recorded number may be used as a reference to determine the usable age of the battery.

Another object of the present invention is to provide a mobile phone battery pack with a recording device and a series data output device, thereby the data of the battery memorized in the record device may be transmitted to a display type battery charger. Through the information displayed on the display of the charger, the user may simply know the using condition of the battery.

To achieve the above objects, in accordance with the present invention, there is provided a mobile phone battery pack with a recording device incorporating with a display type battery charger for displaying the recharged number of times of the battery. The battery pack comprises a casing arranged with a number of metal contacts thereon, a battery unit received inside the inner space of the casing, a printed circuit board arranged inside the casing, and a recording device for memorizing the recharged number of times of the battery. The recording device includes a battery charging detecting circuit, a reference clock generating circuit, a central processing unit, and a recharged times recording unit.

When placing the mobile phone battery into the charging receptacle of the charger for recharging, the total recharged number of times recorded in the recharged times recording will be increased by one, and at the same time the recharged number of times will be displayed on the display of the battery charger.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
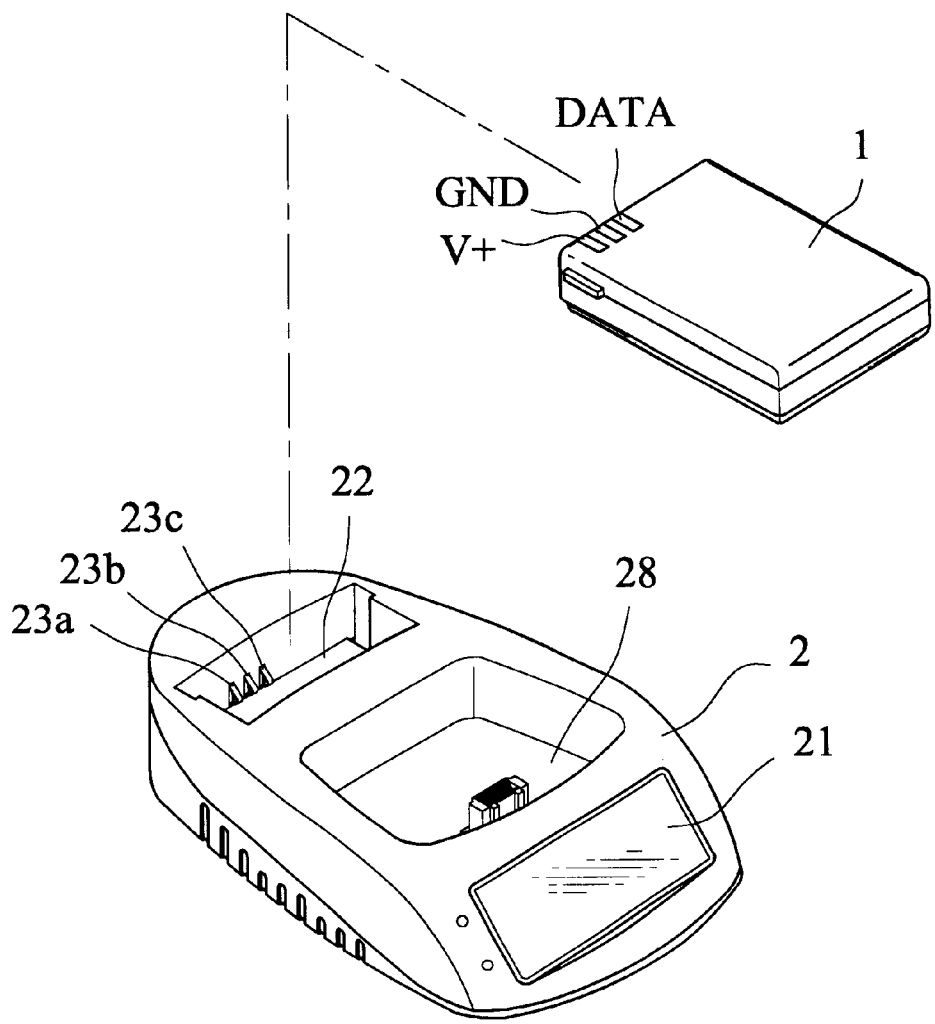
FIG. 1 is a perspective view showing a mobile phone battery pack being separated from a display type battery charger in accordance with a preferred embodiment of the present invention.
Figure 2:
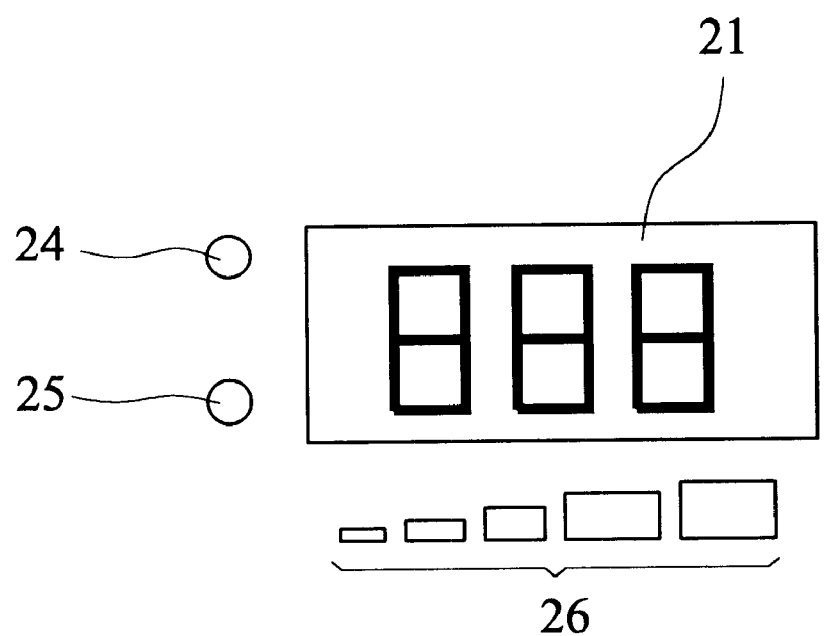
FIG. 2 is an example showing a number being displayed on the display of FIG. 1.

With reference to the drawings, in particularly to FIGS. 1 and 2, according to a preferred embodiment of the present invention, the mobile phone battery pack 1 with recording device for memorizing the recharged number of times of the present invention incorporates with a battery charger 2 with a display 21 for displaying the total recharged number of times of the battery 1 on the display 21. Typically, the battery pack 1 is provided with a positive power terminal V+, a negative power terminal GND, and a data output terminal DATA.

The display type battery charger 2 is formed with a charging receptacle 22 having a number of metal contacts 23a, 23b, and 23c arranged thereon for contacting to the positive power terminal V+, negative power terminal GND, and data output terminal DATA of the battery 1 respectively when placing the battery 1 in the charging receptacle 22. Usually, the charger 2 is further formed with a mobile phone charging receptacle 28 for a mobile phone being inserted therein directly and recharged.

Preferably, as shown in FIG. 2, excepting a full charged indicator 24 and a charging indicator 25, the battery charger 2 is further arranged with a LCD display 21 for displaying the total recharged number of times of the mobile phone. Furthermore, a number of charging status indicators 26 may be arranged on an area near the display 21 for showing the charging condition and capacity of the battery.

Figure 3:
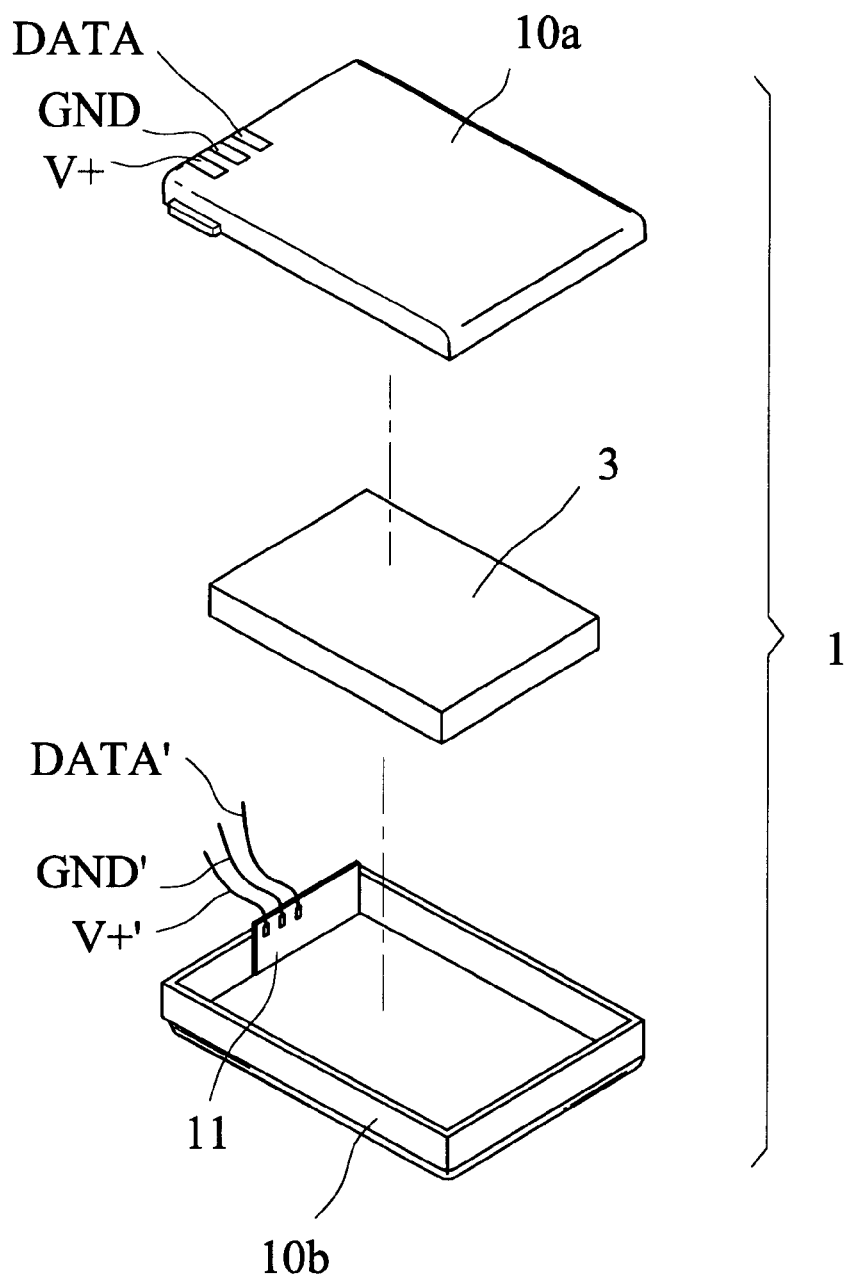
FIG. 3 is an exploded view of the mobile phone battery pack of the present invention.

With reference to FIG. 3, the mobile phone battery pack 1 of the present invention comprises a battery casing composed of an upper casing 10a and a lower casing 10b assembling together to form an inner space for receiving a battery unit 3 therein. The positive power terminal V+, the negative power terminal GND, and the data output terminal DATA are arranged on the upper casing 10a of the battery pack 1. The data output terminal DATA may be arranged in a line the same as the positive power terminal V+ and the negative power terminal GND or in another suitable place on the upper casing 10a.

A printed circuit board 11 is fixed in a suitable place in the inner space between the upper casing 10a and the lower casing 10b, having a positive power line V+', a negative power line GND', and a data output line DATA'. The positive power line V+' and the negative power line GND' are correspondingly connected to the positive power terminal V+ and the negative power terminal GND on the upper casing 10a respectively, and the data output line DATA' is connected to the data output terminal DATA on the upper casing 10a.

A control circuit is arranged on the printed circuit board 11 for recording the number of recharged times. When placing the battery 1 in the charging receptacle 22 for recharging, the charged number of the times memorized in the recording device will be sent out from the data output terminal DATA of the battery 1 to the battery charger 2 and be displayed on the display 21 of the charger 2.

Figure 4:
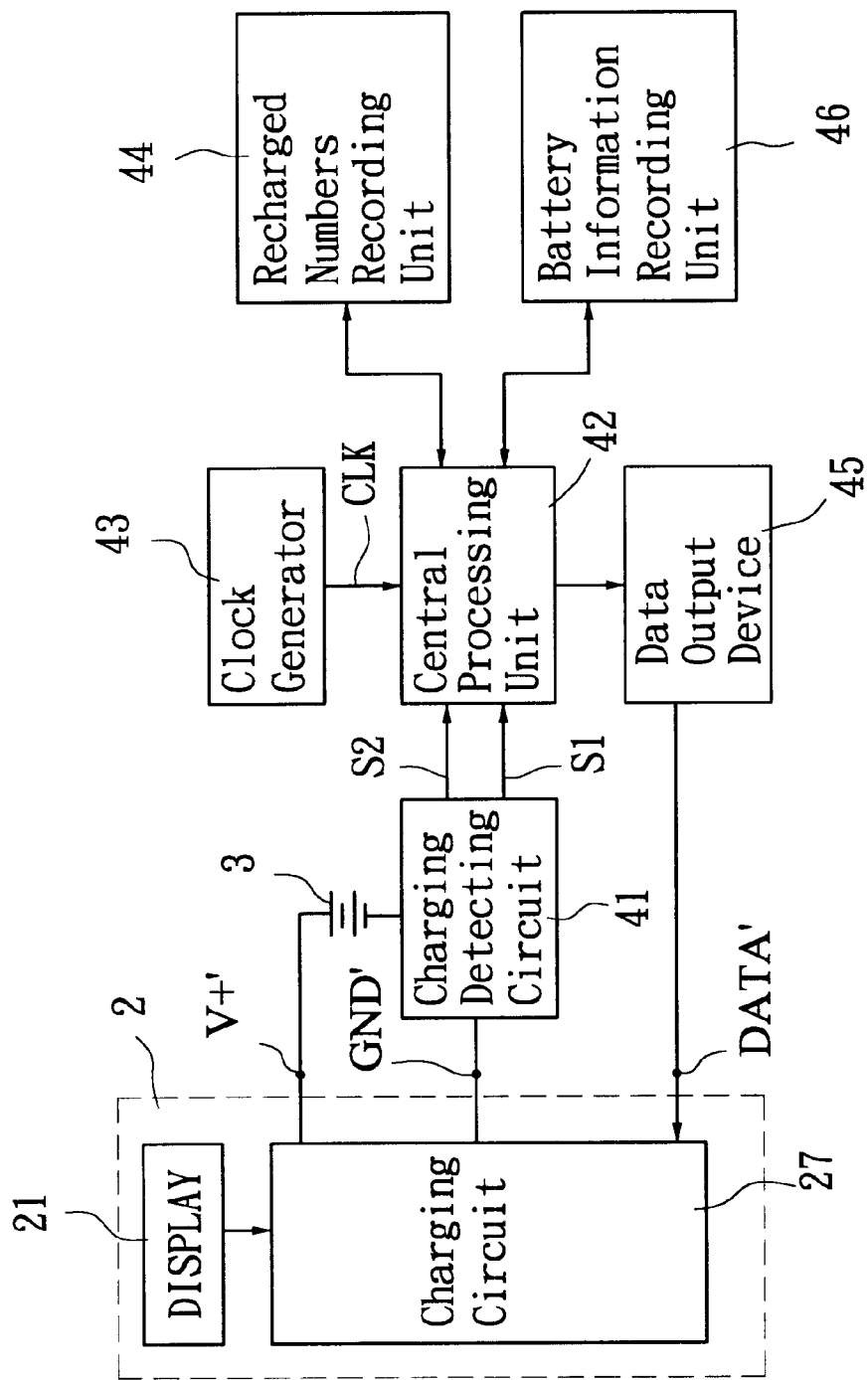
FIG. 4 is a schematic circuit diagram of the control circuit of the present invention.

FIG. 4 is a schematic circuit diagram of the control circuit of the present invention. The battery charger 2 comprises a charging circuit 27 and a display 21. The positive power line V+' and the negative power line GND' of the charger 2 are connected to the positive power terminal V+ and the negative power terminals GND of the battery respectively when charging.

The recording device for memorizing the recharged number of times comprises a battery charging detecting circuit 41 connected with the battery unit 3 of the mobile phone battery 1. When detecting a charging current passing through the battery unit 3 of the battery 1, the battery charging detecting circuit 41 will generate a triggering signal S1 to the central processing unit 42.

A reference clock generating circuit 43 connects to the central processing unit 42 for producing a reference clock signal CLK. The central processing unit 42 can receive the triggering signal S1 produced by the battery charging detecting circuit 41 and the reference clock signal CLK produced by the reference clock generating circuit 43.

A recharged times recording unit 44 is connected to a data port of the central processing unit 42, capable of recording the total recharged number of times of the battery 1. When the central processing unit 42 receives the triggering signal S1 produced by the battery charging detecting circuit 41, the central processing unit 42 will start counting based on the reference clock signal CLK. When a predetermined accumulating recharging time, such as two hours in fast charging mode or eight hours in slow charging mode, the total number recorded in the recharged times recording unit 44 will be increased by one under control of the central processing unit 42.

Different type of mobile phone battery pack, such as Ni—H or Lithium battery, has different electric characteristic, therefore the recharging time needed is various. Besides, the habit differs from each user when recharging the battery. The problems of various types of the battery and different using habits may be easily overcome by modifying the program of the central processing unit.

Besides, a series data output device 45 has a data input terminal connected to an output port of the central processing unit 42 and an output terminal connected to the data output line DATA', for sending out the total recharged number of times memorized in the recharged times recording unit 44 to the battery charger 2 through the data output line DATA'. So, the recorded total recharged number of times of the battery may be displayed on the display 21 of the battery charger 2.

Furthermore, the battery pack of the present invention further comprises a battery information recording device 46 for recording various internal information of the battery 1, such as battery type, date of production, batch number, series number, rated voltage, and rated current. All these data may be also sent to the charger 2 through the data output line DATA' under control of the central processing unit 42.

Figure 5:
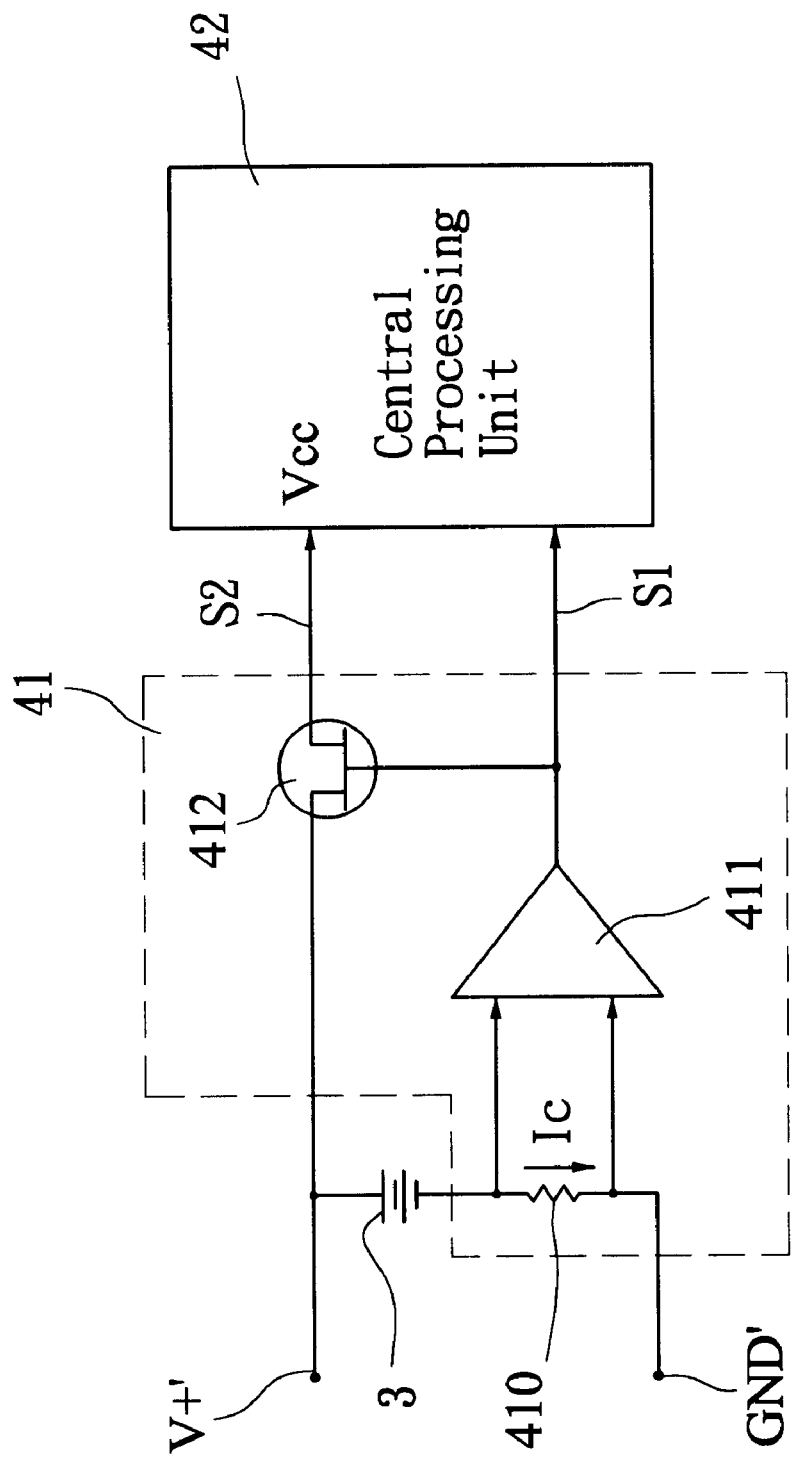
FIG. 5 is a further control circuit diagram of the battery charging detecting circuit of FIG. 4.

FIG. 5 shows the further control circuit of the battery charging detecting circuit in FIG. 4, comprising a series resistor 410 and a current differential amplifier 411. The series resistor 410 is connected with the battery unit 3 in series. The current differential amplifier 411 has two input terminals connected to the two terminals of the series resistor 410 in parallel, so that the charging current Ic passing through the battery unit 3 may be detected. Upon detecting the charging current Ic, the current differential amplifier 411 will generate a triggering signal S1 to the central processing unit 42.

The battery charging detecting circuit 41 further comprises a switch element 412 having a gate terminal connected to the output terminal of the current differential amplifier 411. When the triggering signal S1 is produced, the switch element 412 will be switched on, so that the electric power of the battery unit 3 may be supplied to the power source terminal Vcc of the central processing unit 42. Alternatively, when the triggering signal S1 is not produced, the switch element 412 will be switch off to suspend the power to the central processing unit 42 so as to save electric power energy.

Although the present invention has been described with respect to the preferred embodiment, it is contemplated that a variety of modifications, variations and substitutions may be done without departing from the scope of the present invention that is intended to be defined by the appended claims.

I claim:

1. A mobile phone battery pack, comprising:
   a battery casing having an inner space for retaining a battery unit therein, provided with a plurality of metal contacts comprising a positive power contact, a negative power contact, and a data output terminal;
   a printed circuit board fixed in the inner space of the battery casing, comprising a positive power line connected to the positive power terminal, a negative power line connected to the negative power terminal, and a data output line connected to the data output terminal formed on the battery casing; and
   a charged number recording circuit arranged on the printed circuit board for accumulating the recharged number of times of the battery.

2. The battery pack as claimed in claim 1, wherein the charged number recording device comprising:
   a battery charging detecting circuit for detecting a charging current passing through the battery unit and then generating a triggering signal;
   a reference clock generating circuit for generating a reference clock signal;

a central processing unit for receiving the triggering signal produced by the battery charging detecting circuit and the reference clock signal produced by the reference clock generating circuit; and a recharged times recording unit connected to the central processing unit;

when the central processing unit receives the triggering signal produced by the battery charging detecting circuit and a predetermined accumulating recharging time is reached, the total recharged number recorded in the recharged times recording unit is increased by one.

3. The battery pack as claimed in claim 2, wherein the battery charging detecting circuit comprising:

a series resistor connecting with the battery unit in series; and a current differential amplifier having two input terminals connected across the series resistor in parallel, having an output terminal connected to the central processing unit;

when a charging current passes through the battery unit and the series resistor, the current differential amplifier send out a triggering signal via its output terminal to the central processing unit.

4. The battery pack as claimed in claim 3, wherein the battery charging detecting circuit further comprises a switch element controlled by the triggering signal, the switch element being switched on when the triggering signal being produced for supplying an electric power of the battery to the central processing unit, while the switch element being switch off when the triggering signal being not produced for suspending the power of the battery to the central processing unit.

5. The battery pack as claimed in claim 2, further comprising a series data output device having a data input terminal connected to the central processing unit and a data output terminal connected to the data output terminal of the battery for sending out the recharged number of times recorded in the recharged times recording unit to the data output terminal under control of central processing unit.

6. The battery pack as claimed in claim 2, further comprising a battery information recording device coupled to the central processing unit for recording a plurality of information comprising battery type, date of production, batch number, series number, rated voltage, and rated current of the battery.

* * * * *